(12) United States Patent
Panfil et al.

(10) Patent No.: US 9,859,699 B2
(45) Date of Patent: Jan. 2, 2018

(54) CONDUCTIVE GASKET ASSEMBLY FOR A CORRUGATED ROOF OF A TRAIN CAR

(71) Applicant: The Patent Well, LLC, Fort Worth, TX (US)

(72) Inventors: Matt Panfil, Fort Worth, TX (US); Kent Boomer, Aledo, TX (US)

(73) Assignee: THE PATENT WELL, LLC, Fort Worth, TX (US)

( * ) Notice: Subject to any disclaimer, the term of this patent is extended or adjusted under 35 U.S.C. 154(b) by 0 days.

(21) Appl. No.: 15/063,866

(22) Filed: Mar. 8, 2016

(65) Prior Publication Data
US 2016/0268790 A1 Sep. 15, 2016

Related U.S. Application Data

(60) Provisional application No. 62/131,508, filed on Mar. 11, 2015, provisional application No. 62/144,619, filed on Apr. 8, 2015.

(51) Int. Cl.
*H02G 3/18* (2006.01)
*H02G 3/22* (2006.01)
(Continued)

(52) U.S. Cl.
CPC ............... *H02G 3/22* (2013.01); *B61D 49/00* (2013.01); *F16J 15/022* (2013.01); *F16J 15/064* (2013.01);
(Continued)

(58) Field of Classification Search
CPC . H02G 3/22; B61D 49/00; F16J 15/022; F16J 15/064; F16J 15/102
(Continued)

(56) References Cited

U.S. PATENT DOCUMENTS 6,530,577 B1 * 3/2003 Busby .................... B32B 27/04
277/651
6,695,320 B2 * 2/2004 Busby .................... B32B 27/04
277/651
(Continued)

OTHER PUBLICATIONS

Mueller, Inc., steel building & residential metal roofing, trim components, wwwMuellerInc.com, 28 pages Aug. 31, 2015.

*Primary Examiner* — Tremesha S Willis
(74) *Attorney, Agent, or Firm* — Jackson Walker LLP (57) ABSTRACT

An electrically conductive assembly for providing a low electrical resistance contact between an antenna and the corrugated roof of a train. The assembly comprises a gel and skeletal gasket member which has an electrically conductive skeleton encapsulated in a tacky gel. Multiple foam and gel members, typically made up of compressible at least partially open cell foam, are laid in the troughs and are thick enough, such that the top surface of the foam and gel members is about equal to or slightly higher than the top surfaces of the ridges of the corrugated train roof. The antenna is then laid atop the gel and gasket member and bolted to the roof with fasteners in such a manner that the tacky flowable gel at least partially squeezes out the edges of the gel and gasket member as the antenna is compressed downward while the fasteners are snugged up. This compression allows the electrically conductive skeletal member to provide contact between the antenna and the roof, the roof typically metallic and that results in a decrease of EMI (electromagnetic interference).

19 Claims, 8 Drawing Sheets

(51) Int. Cl.
*B61D 49/00* (2006.01)
*F16J 15/02* (2006.01)
*F16J 15/06* (2006.01)
*F16J 15/10* (2006.01)
*H01Q 1/32* (2006.01)
*H01Q 1/48* (2006.01)

(52) U.S. Cl.
CPC ........... *F16J 15/102* (2013.01); *F16J 15/104* (2013.01); *H01Q 1/3275* (2013.01); *H01Q 1/48* (2013.01)

(58) Field of Classification Search
USPC .................. 174/667, 250, 251, 255–259
See application file for complete search history.

(56) References Cited

U.S. PATENT DOCUMENTS 7,229,516 B2 \* 6/2007 Busby .................... B32B 27/04
156/247
7,339,482 B2 3/2008 Jaeger et al.

\* cited by examiner

CONDUCTIVE GASKET ASSEMBLY FOR A CORRUGATED ROOF OF A TRAIN CAR

This application claims priority from and the benefit of U.S. Provisional Application Ser. No. 62/131,508, filed Mar. 11, 2015; and U.S. Provisional Application Ser. No. 62/144,619, filed Apr. 8, 2015, both of which are incorporated herein by reference

FIELD OF THE INVENTION

Gaskets, namely electronically conductive gaskets for adapting an antenna to the corrugated roof of a train car.

BACKGROUND OF THE INVENTION

Railroad trains sometimes use transmitting and/or receiving antennas mounted to the roof of a train car. In such an application, because of RF interference, conductivity is required between the antenna and the roof. Currently, due to the corrugations of the roof and the flat base of the antenna, a metal plate is machined to fit between the corrugated roof and the underside of the antenna. The machined plate has lands and bays that are the reverse of the ridges and troughs on the corrugated roof. Fasteners are applied to hold the antenna base to the plate and the plate to the roof. Then silicone gum is applied all around the base and the machined plate and fasteners. The plate provides conductivity and the silicon provides an environmental seal to prevent elements such as moisture from finding the way into the car through, for example, fastener holes.

There are certain shortcomings to this present method of mounting an antenna to a corrugated roof. Applicants' assembly overcomes at least some of the shortcomings to provide an effective environmental seal between the antenna assembly and the roof and further to provide for effective conductivity between the antenna and the roof, so as to overcome EMI problems.

SUMMARY OF THE INVENTION

Applicants provide a novel conductive sealant assembly for interposition between an antenna assembly and a corrugated roof of a train for substantially sealing out air and moisture.

Railroads travel through a harsh environment. They are subject to a variety of thermal conditions, moisture conditions and harsh vibration. Moisture is a catalyst corrosion and may condense and creep in everywhere. Corrosion may attack the antenna/locomotive metallic junction and cause a breakdown in electrical conductivity, which is typically required for RF EMI inhibition. Applicants provide, in one embodiment, a conductive polyurethane gel gasket which may be used sometimes in conjunction with a sealing tape (such as a stretchable gel impregnated sticky foam tape) to moisture proof the connection between the antenna and the train. The gel of the gel skeletal member will migrate to fill surface voids and surface. The gel will remain tacky despite vibration and temperature variation. It may flow around and protect fasteners and the metallic skeleton provides an electrical ground across the antenna/roof surface.

A corrugated roof of a train car has ridges and troughs and side walls between the ridges and troughs. The typical antenna assembly has a flat slightly curved base to engage the tops of the ridges of the train roof. Applicants' conductive sealant assembly is comprised of at least an encapsulated skeletal member that includes, in one embodiment, a metallic skeleton encapsulated with a cured, soft tacky polyurethane gel. The conductive sealant assembly may include foam/gel members where the troughs are. The foam/gel members build up the troughs until the top of foam/gel members is even with the ridges and on this even or slightly curved plane comprising the top of the foam/gel member and the ridge tops lay the encapsulated skeletal member which is usually cut to the footprint of the antenna base.

Fasteners compress the antenna base to the roof, such that the soft encapsulated gel is partly squeezed out and the underside of the base contacts the skeletal member and the skeletal member contacts the ridge top to provide conductivity between the antenna and the roof, so as to reduce the problem of EMI or radio frequency interference while at the same time providing a good environmental seal against moisture and other containments.

In one embodiment, applicants' provide an electrically conductive assembly for providing a low resistance electrical contact between an antenna, the antenna having an underside, a footprint, and an antenna cable extending from the underside, and a corrugated train roof having multiple ridges with top surfaces and multiple troughs with floors. The assembly may comprise a gel and skeletal gasket member comprising an electrically conductive skeletal member encapsulated in a tacky gel, the gel and skeletal gasket member dimensioned to have a perimeter about the same as the footprint of the antenna; at least one foam/gel member dimensioned to fit between the underside of the gel and skeletal gasket member and the floor of the troughs; and the gel and skeletal gasket member for laying atop the foam/gel member and the top surfaces of the ridges and beneath the underside of the antenna such that compression between the antenna and the roof will cause some of the gel of the gel and skeletal gasket member to squeeze out and will cause contact between the skeletal member and the roof and the skeletal member and the underside of the antenna and will cause contact, and sometimes compression between the underside of the antenna and the top of the foam/gel member.

In one embodiment, applicants' provide an electrically conductive assembly for providing a low resistance electrical contact between an antenna, the antenna having an underside, a footprint, and an antenna cable, and a corrugated train roof having multiple ridges with top surfaces and multiple troughs with floors. The assembly may comprise a gel and skeletal gasket member comprising a metallic or electrically conductive member encapsulated in a tacky gel, the gel and skeletal gasket member dimensioned to have a perimeter about the same as the footprint of the antenna; at least one foam/gel member dimensioned for a contact fit between the underside of the antenna and the underside of the gel and skeletal gasket member and the floor of the troughs; the gel and skeletal gasket member for laying atop the foam/gel member and the top surfaces of the ridges and beneath the underside of the antenna such that compression between the antenna and the roof will cause some of the gel of the gel and skeletal member to squeeze out and will cause contact between the skeletal member and the roof, and the skeletal member and the underside of the antenna; and further comprising a perimeter seal; wherein the gel is polyurethane; wherein the gel is cured; and wherein the foam is compressible and at least partly saturated with gel.

In one embodiment, applicants provide an electrically conductive assembly for providing a low resistance electrical contact between an antenna, the antenna having an underside, a footprint, and an antenna cable, and a corrugated train roof having multiple ridges with top surfaces and multiple troughs with floors. The assembly may comprise a gel and skeletal gasket member comprising a metallic member encapsulated in a tacky gel, the gel and skeletal gasket member dimensioned to have a perimeter about the same as the footprint of the antenna; at least one foam/gel member dimensional to fit between the underside of the gel/skeletal gasket member and the floor of the troughs; the skeletal gasket member for laying atop the foam/gel member and top surfaces of the ridges and beneath the underside of the antenna such that compression between the antenna and the roof will cause some of the gel to squeeze out and will cause contact between the electrically conductive skeletal member and the roof and the electrically conductive skeletal member and an underside of the antenna; and further comprising a perimeter seal; wherein the gel is polyurethane; wherein the gel is cured; wherein the foam of the foam/gel member is compressible and at least partly saturated with gel; and further comprising a gasket tape wrap for wrapping the antenna cable; and, wherein the electrically conductive skeletal member is woven metal.

DETAILED DESCRIPTION OF THE PREFERRED EMBODIMENT

Figure 1:
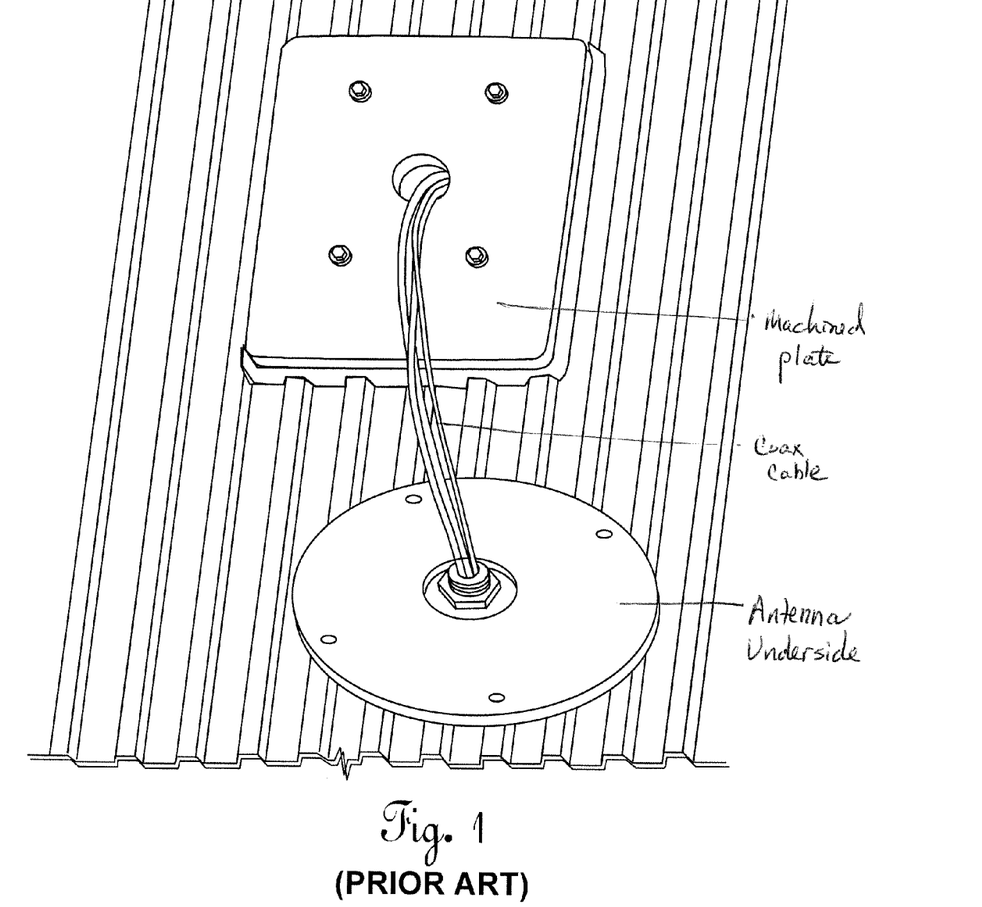
FIG. 1 is an illustration of the prior art machined plate and antenna.

FIG. 1 illustrates prior art machined plate for mounting an antenna gasket to a corrugated roof of a train.

FIGS. 2, 2A, 2B and 2c illustrate the manner in which an encapsulated gel/skeletal member 18 of an electrically conductive sealant assembly 16 lays atop a corrugated train roof 14 and includes multiple foam/gel members 24 or foam only members sandwiched between, and typically under compression between the underside of an antenna 12 and train roof 14. Antenna 12 is seen to have a base 12a, and upstanding mast 12c, and multiple fasteners 12b to fasten the base to the train roof with applicants conductive sealant assembly 16 under compression therebetween. The antenna is seen to have generally flat base 12a with a flat underside. Train roof 14 is seen to be corrugated and to have multiple ridges 14a separated by multiple troughs 14b with sidewalls 14c between the ridges and the troughs. Applicants' conductive sealant assembly 16 is seen to comprise at least encapsulated gel/skeletom member 18, which may include a metallic skeleton 20 (in one embodiment, a woven skeleton member) or other suitable metallic membrane and a soft, sticky, polyurethane gel 22 (typically cured) or other suitable material in which skeleton 20 is embedded or encapsulated. Typically, there is little or no water or air bubbles in the gel or the encapsulated skeleton member 18.

Applicants' conductive sealant assembly 16 may also include one or more foam/gel members 24, which is seen in one embodiment to comprise a foam 26, such as an open or partly open cell foam at least partially saturated with or covered by a gel 28, such as a polyurethane gel, which may be cured. A perimeter seal 30, such as Av-DEC Thixoflex®, is seen to cover and enclose the perimeter of gel/skeletal member 18, the perimeter seal with an upper boundary 30a for engaging the perimeter of antenna base 12a and a lower boundary 30b engaging the roof, and in a preferred embodiment substantially enclosing the gel/skeletal member 18.

Applicants' gel/skeletal member 18 may include metallic skeleton 20, such as in a woven skeleton made of a conductive metal such as aluminum, aluminum alloy or other suitable conductor. Gel 22 may be a cured two part polyurethane gel that, uncured, encapsulates and fills the voids in the woven, metallic skeleton 20 so that there are no air bubbles in the encapsulated gel/skeleton member 18 and then cures, after which the gel/skeleton member may be used as disclosed. One such encapsulated conductive gel/skeleton member is available from Av-DEC, Mony St., Fort Worth, Tex., as Hi-Tak polyurethane conductive gasket, Part No. AD2740X. The encapsulated gel/skeleton member, the method of manufacturing and a further description of its structure, function and properties may be found in U.S. Pat. Nos. 6,530,577 and 6,695,320, both of which are incorporated herein by reference.

Figure 6:
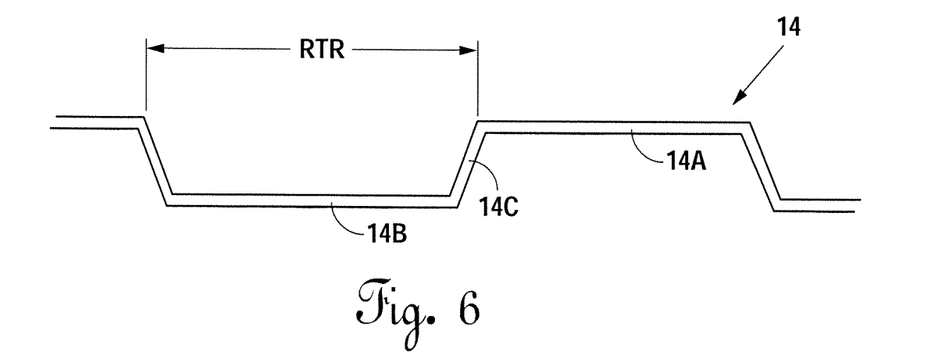
FIG. 6 is a side view of the corrugated roof showing some dimensions.
Figure 6A:
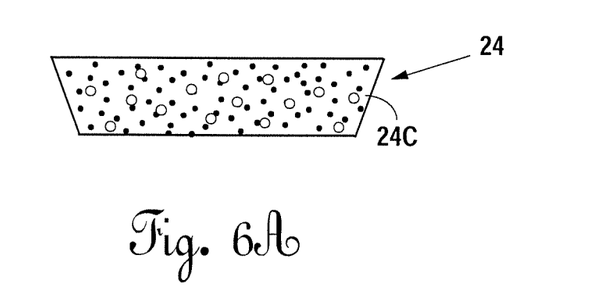
FIGS. 6A and 6B are cross-sections of two embodiments of a foam gel tape member shaped to fit in the troughs.
Figure 6B:
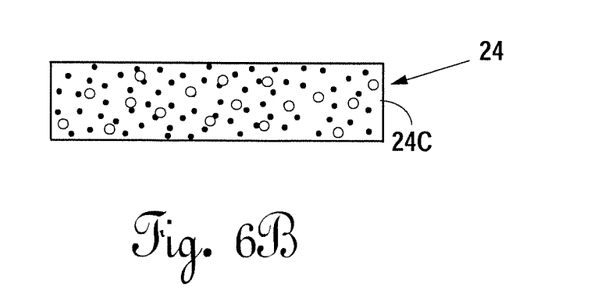

Some details of Applicants' foam/gel member 24, its structure, function and properties may be found in U.S. Pat. No. 7,229,516, incorporated herein by reference. Foam 26 may be an open cell foam, a semi open cell foam, or even a closed cell foam, which is coated with the gel. FIG. 14 of the '516 patent shows the manner in which a knife is used to cut an at least partially saturated open cell foam into a strip which may be dimensional to fit troughs 14b. FIGS. 6A and 6B illustrate that the sidewalls 24c of the foam may be generally perpendicular or angled to match the sidewall profile of the trough in which the foam/gel is placed. The angled relationship may be achieved by holding the knife at an angle when cutting the gel foam into strips.

Corrugated roofs of trains often have profiles with different dimensions from one brand to another. The depth of the corrugations may differ from one model train to the next, as may the width of the troughs and the angles of the sidewalls. In one method, applicant uses multiple thin foam/gel members layered, one with the least width at the bottom, followed by the same width or sequentially wider foam gel members (shown) until the top of the last of the multiple members is about equal to or slightly above the ridge top (see FIG. 2B). FIG. 2B shows one such trough built up with three foam/gel layers: 24a/24b/24c (the right side one of the two troughs illustrated in FIG. 2B). Each layer is usually sticky and has a sticky outer surface which will allow it to tightly sealed against the corrugated roof and against the adjacent foam/gel layer, with the top of the uppermost layer 24c having a tacky gel contact with the underside of gel/skeletal member 18. FIG. 2B illustrates single foam/gel member 24.

Figure 2:
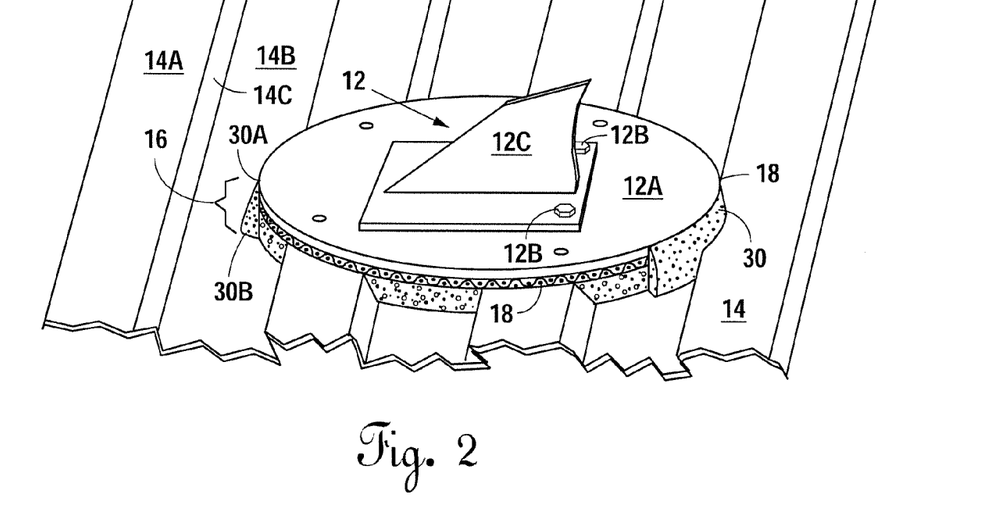
FIG. 2 is a perspective view of the antenna assembly comprising an antenna mounted to a train roof.
Figure 2A:
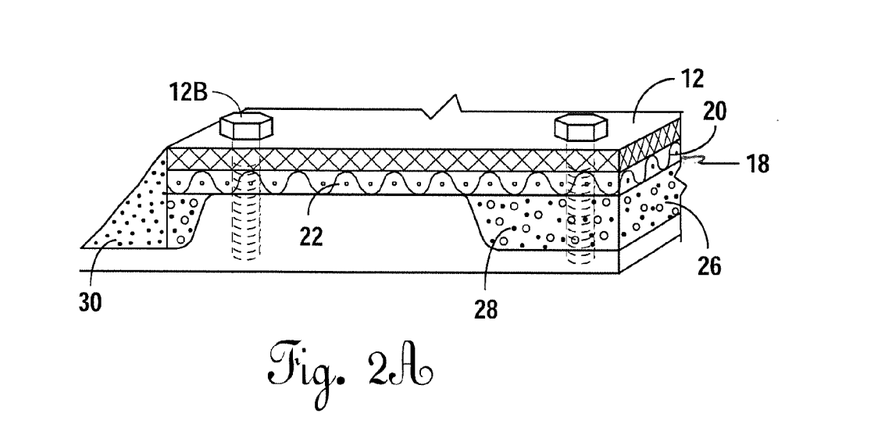
FIG. 2A is a cutaway cross-section of FIG. 1.
Figure 2B:
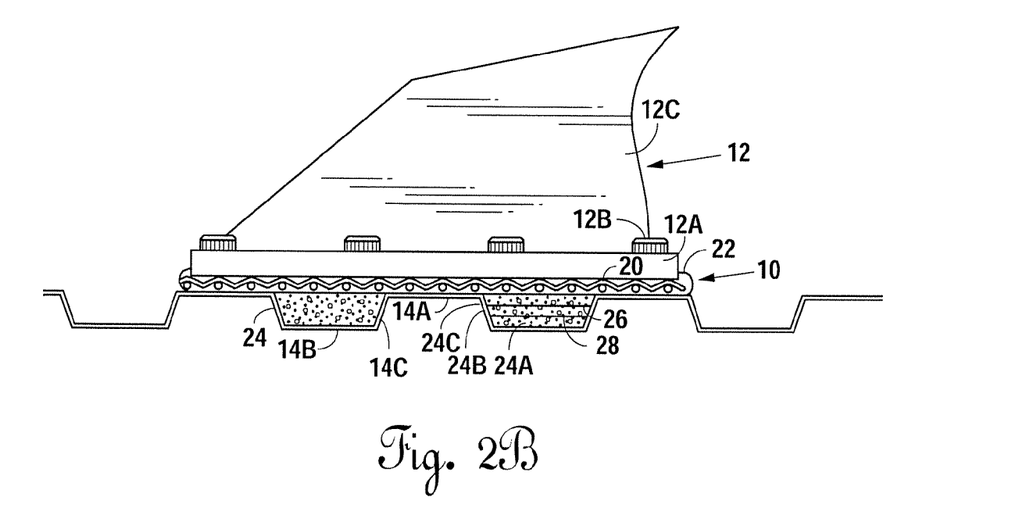
FIG. 2B is a cross-section of applicants antenna assembly showing the encapsulated skeletal member, the foam gel member sandwiched under compression between the ridges and troughs of the corrugated train roof and the base of the antenna.
Figure 2C:
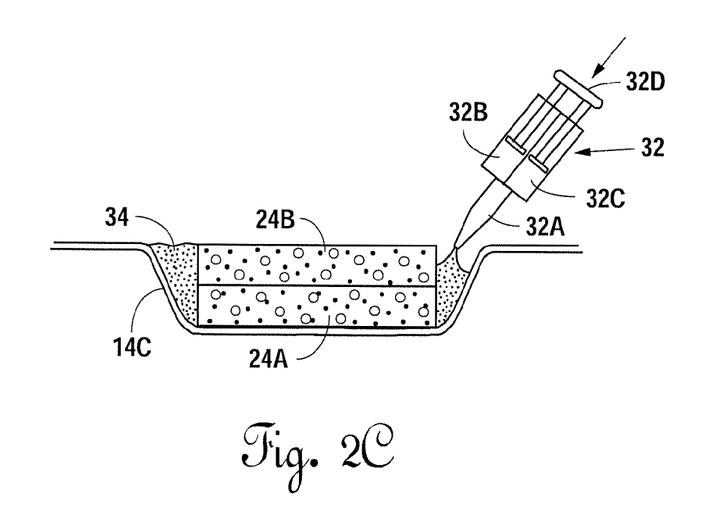
FIG. 2C illustrates an alternate manner in which the troughs may be built up, while avoiding air pockets and insuring a good environmental seal between the antenna and roof.

FIG. 2C illustrates a method in which trough 14b may be built up using one or combination of foam/gel layers 24 (here 24a/24b) along with a cure in place injectable gel sealant 34. The injectable cure in place sealant may be injected as "make up gel" or "gap filler" in any gaps left between the side walls of the layered foam gel and the trough sidewalls 14c, as illustrated in FIG. 2C. An injector 32 having a mixing nozzle 32a and two compartments 32b/32c may be provided along with a forcing element 32d. In each of the two compartments 32b/32c, there are the two parts of injectable sealant 34. When forcing element 32d is pushed in the direction indicated, the two parts will mix in nozzle 32a and, in one embodiment, in a gel form, fill the gap between the sidewalls of the foam/gel member and the sidewalls of the trough, and after a few minutes will cure. Injectors and two component cure-in-place polyurethane systems are available from Avdec, an injectable sealant sold under the mark Self-leveling Green. This product is a two component polyurethane designed to produce a water-tight, flexible seal.

In the embodiment set forth in FIG. 6A, sidewalls 24c are beveled at an angle, so as to sit flush against sidewalls 14c of the roof. In FIG. 6B, the straight cut sidewalls 24c may be used, even where sidewalls 14c of the roof are angled, due to the compressibility and deformability of the foam, the embodiment illustrated in FIG. 6B having a width about equal to the ridge to ridge dimension (see RTR in FIGS. 6 and 6C).

Figure 3:
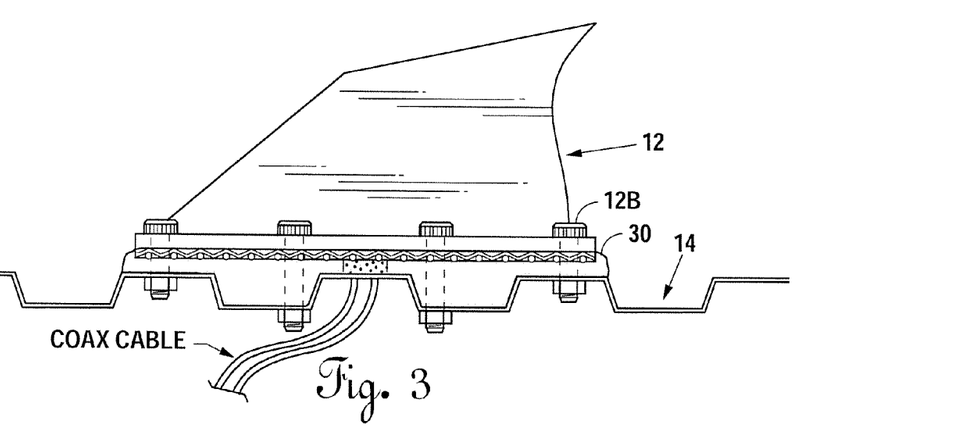
FIG. 3 is a side view showing a perimeter seal coating the exterior of the conductive sealant assembly from the edges of the base of the antenna to the surface of the train roof.
Figure 4:
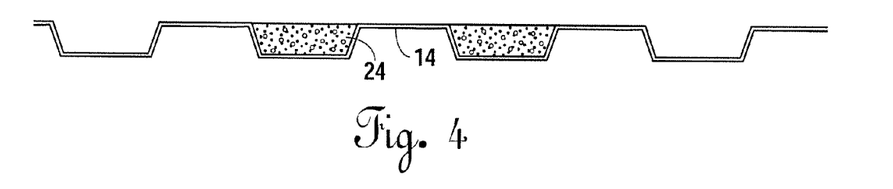
FIG. 4 shows the manner in which the foam gel member is fitted into the troughs between the ridges of the corrugated roof.
Figure 5:
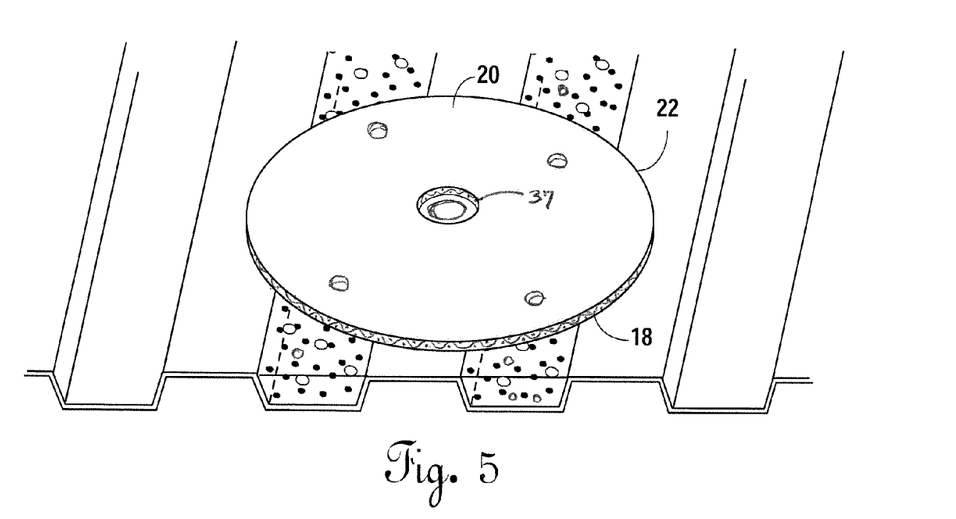
FIG. 5 is an isometric view showing the encapsulated skeletal member and illustrating the manner in which the perimeter of the encapsulated skeletal member is cut to the footprint of the base of the antenna and lays on top of the surface of the ridges of the roof.
Figure 6C:
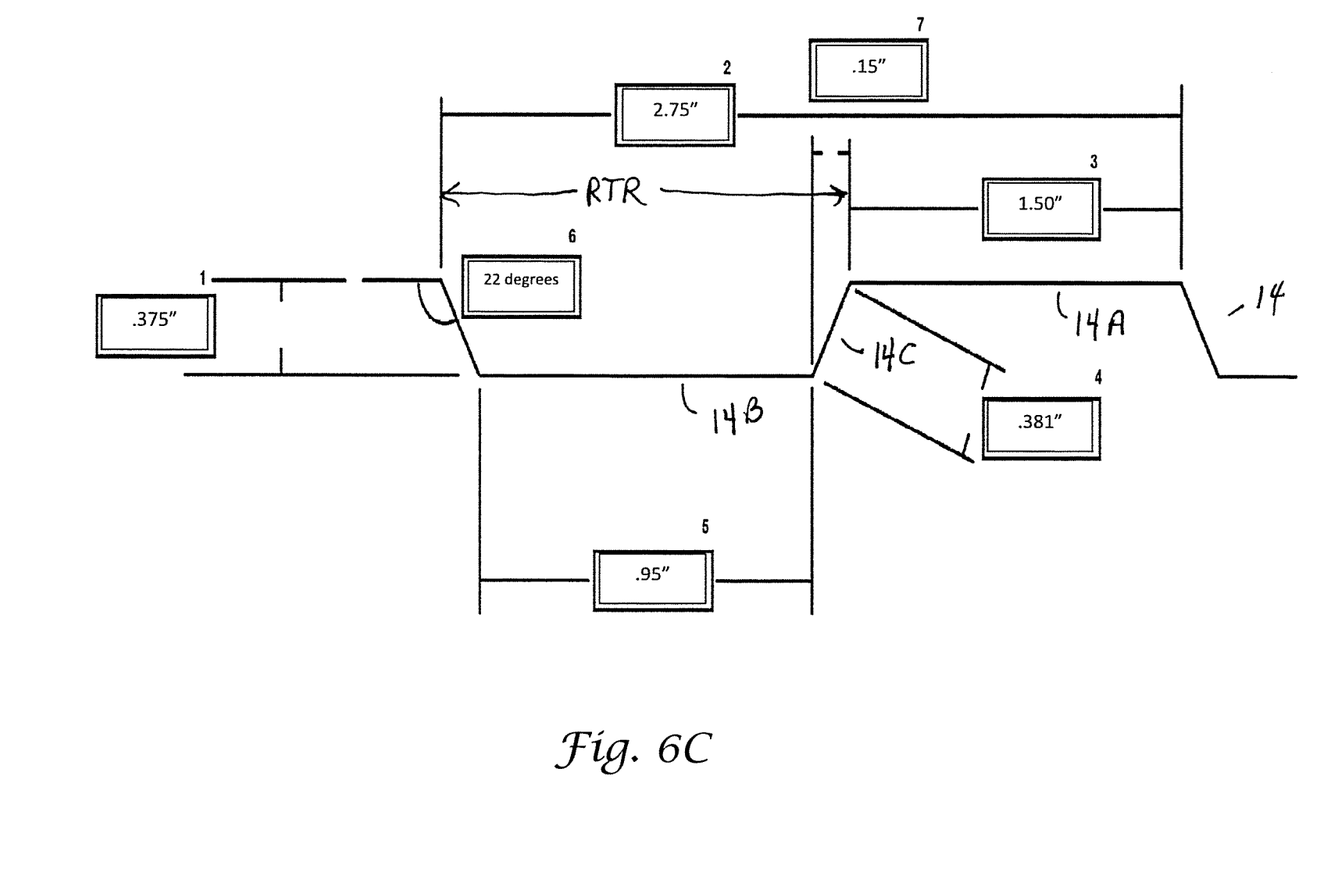
FIG. 6C is a schematic illustration of roof dimensions for use with Applicant's assembly.

FIG. 6C illustrates an example of the dimensions found in a train roof 14 as stated above. These dimensions may vary, but typically include multiple ridges 14a, multiple troughs 14b, and canted sidewalls 14c. As can be seen in FIGS. 5 and 6C, the thickness of applicants foam/gel member 24 may be in one embodiment, about 375 mil and the width RTR may be about 1.10 inches. With such dimensions the foam/gel member will substantially fill the trough area sealing out air and moisture as the gel acts as an effective sealant and the foam is a compressible substrate to carry the deformable, flowable, tacky gel (see FIG. 3).

FIGS. 2 and 5 illustrate the manner in which the encapsulated gel/skeleton member 18 of Applicants' conductive sealant assembly 16 is cut or otherwise shaped to fit the footprint or perimeter of base 12a of antenna 12. The gel/skeletal member 18 may be die cut by the methods set forth in the patents incorporated herein by reference. Foam/gel member 24 may be manufactured and dimensioned according to the methods set forth in the patents incorporated herein by reference in the dimensions set forth herein. The foam/gel member may be cut with scissors or a knife to conform to the curved perimeter of the base 12a.

When applicants encapsulated gel/skeletal member 18 is layered up and the antenna and fasteners engage the roof, compression generated by the fasteners will cause the base of the antenna to pull towards the roof and squeeze out some of the soft gel and generate contact and electrical conductivity between the underside of the base from the top of the ridges through metallic skeleton 20 thus providing electrical conductivity, but with the gel assuring a good environmental seal to keep out moisture and other harmful matter which could cause corrosion. After compression has been placed on the gel/skeletal member 18 and the underlaying foam/gel layer or layers, excess squeeze out at the edge of the perimeter may be wiped away as with an alcohol soaked rag and optionally perimeter seal 30 may be applied, perimeter seal 30 such as available from Av-DEC as Thixoflex Orange or Gray, a two-part form and cure in place tacky, soft injectable sealant. Perimeter seal 30 may be a two-part mix applied, shaped (if necessary) and then cured in place around the perimeter of the assembly 6 from the top edge 30a engaging an outer sidewall of the antenna base typically all the way around and a bottom edge 30b engaging the roof (see the exterior view in FIG. 2). Another such perimeter seal is Thixoblack a hard non-tacky, non-gel durable elastomer available from Av-DEC.

Figure 7:
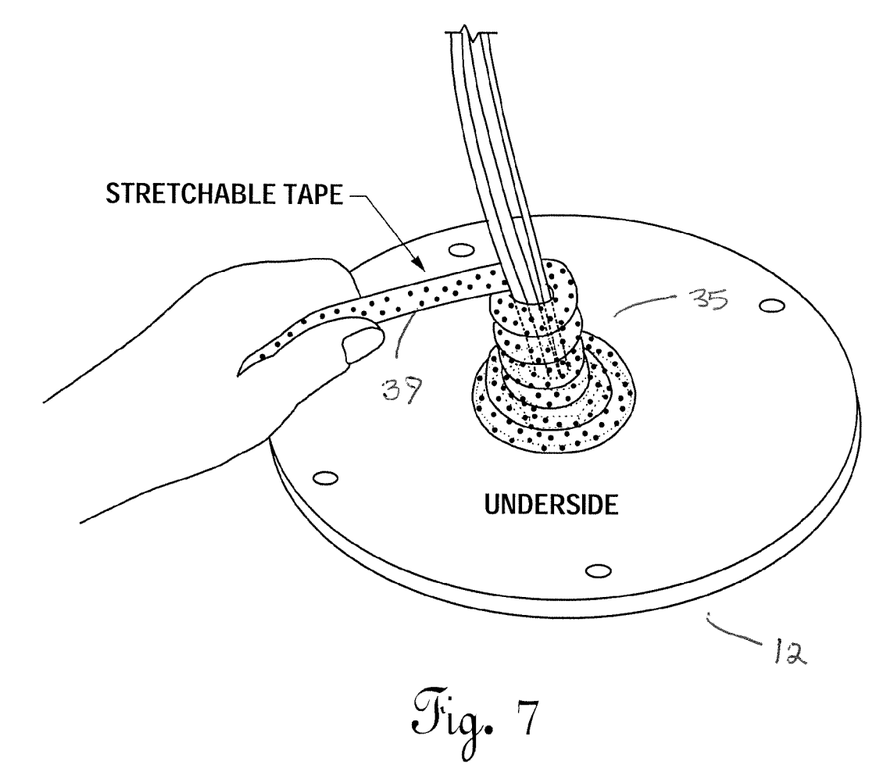
FIG. 7 illustrates a gasket wrap for use at or near a co-axial connection or other electrical connection.

FIG. 7 shows a gasket tape wrap 35 provided at and/or near the location where the co-ax cable leaves the bottom of the antenna, through hole or opening 37 (see FIG. 5 for example). One tape 39 that may be used for gasket tape wrap 35 is Av-DEC StretchSeal®, a foam tape at least partly saturated with tacky, pre-cured, polyurethane elastomeric sealant for sealing and moisture proofing at or near electrical connections and/or on electrical cable and co-axial connectors. It is rectangular, stretchable, and is typically stretched slightly when applied, in an overlapping manner (as illustrated with courses overlapping) to provide for a tight, moisture-proof seal—even around irregular shaped things.

Figure 8:
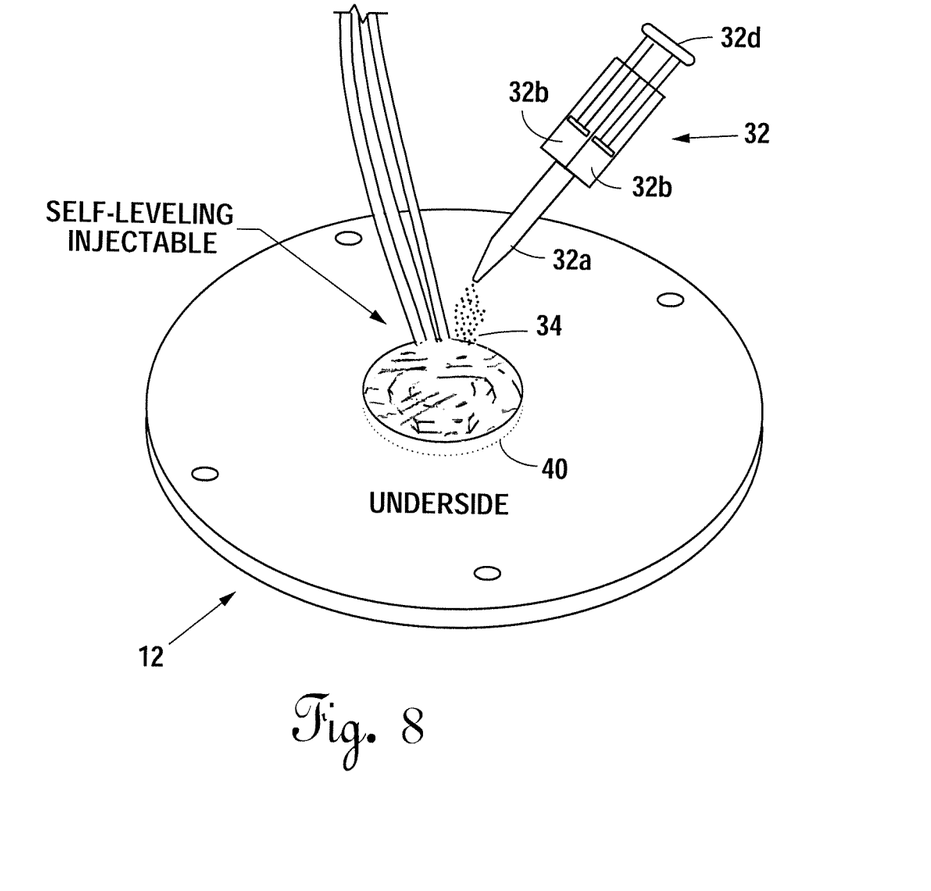
FIG. 8 illustrates a cure-in-place gel seal in a recess about the co-ax cable/antenna junction.

FIG. 8 illustrates another manner of environmentally sealing the area around the underside of the antenna plate or adapter plate. (The antenna with a built-in base may be affixed directly to the sealing assembly or there may be an adapter plate to which the antenna is fixed, as by fasteners, which adapter plate is the base of the antenna and lays on the sealing assembly.) In any case, whatever piece is placed on the upper surface of the conductive sealant assembly 16, there may be a recess 40, the recess where the underside of the antenna/base lays against the conductive sealant assembly, recess 40 as seen in FIG. 8. If this recess is left unfilled, it may act as a pocket of air and moisture, which may, over time, cause corrosion. In one embodiment, where there is a recess on the underside of the base/antenna, Applicant provides a two-part cure-in-place injectable, which may be the same as makeup gel 34. This flowable gel is injected into recess 40 (typically to fill it up) and allowed to cure in place forming a water-tight, flexible gel seal 42, substantially surrounding the co-ax cable and its junction at the base of the antenna, and filling the recess. Gel seal 40 may be used with or without gasket wrap 35 as seen in FIG. 7. Applicator 32 may be used with nozzle 32a and two compartments 32b/32c for containing two parts of a mix that will cure upon mixing and in forcing element 32d. In the few minutes that it takes to cure the injectable will typically self-level, when the antenna is held horizontal upon curing, then inverted and placed against assembly 16 as set forth herein.

Applicant's assembly is, in one embodiment, an environmental sealing assembly for use with vehicles or articles, such as tractor trailers, intermodal shipping containers (seacans), and corrugated roofs of homes or other buildings. Moreover, the corrugations may be R-panel, corrugated tin roofs or the like or any other shaped corrugations. Corrugations may be part of a side wall of a structure. Finally, the gasket assembly may be provided for more electrically conductive applications where any workpiece needs to be environmentally sealed and conductivity is not needed. These applications may include gaskets with molded nylon web or fiberglass mesh skeletons to provide structural integrity to the gel. Articles that may be mounted to corrugated members with Applicant's novel gasket assembly, including air vents, transponders, tracking antennas, any type of transmitting and/or receiving antennas.

Although the invention has been described in connection with the preferred embodiment, it is not intended to limit the invention's particular form set forth, but on the contrary, it is intended to cover such alterations, modifications, and equivalences that may be included in the spirit and scope of the invention as defined by the appended claims. For example, vehicles or articles, such as tractor trailer, intermodal shipping containers (seacons), and corrugated roofs of homes or other builds

The invention claimed is:

1. An electrically conductive assembly for providing a low resistance electrical contact between an antenna, the antenna having a flat underside, a footprint, and an antenna cable extending from the underside, and a corrugated train roof having multiple ridges with top surfaces and multiple troughs with floors, the assembly comprising:
 a gel and skeletal gasket member comprising an electrically conductive skeletal member encapsulated in a tacky gel, the gel and skeletal gasket member dimensioned to have a perimeter about the same as the footprint of the antenna and having a flat top and a flat underside;
 at least one foam/gel member dimensioned to fit between the underside of the gel and skeletal gasket member and the floor of the troughs and to extend above the top surface of adjacent ridges in an uncompressed state; and
 the gel and skeletal gasket member for laying atop the foam/gel member and the top surfaces of the ridges and beneath the underside of the antenna such that compression between the antenna and the roof will cause some of the gel of the gel and skeletal gasket member to squeeze out and will cause contact between the skeletal member and the roof and the skeletal member and the underside of the antenna.

2. The assembly of claim 1, further comprising a gasket tape wrap for wrapping the antenna cable.

3. The assembly of claim 1, further comprising a perimeter seal.

4. The assembly of claim 1, further comprising make up gel.

5. The assembly of claim 4, wherein the make up gel cures in place.

6. The assembly of claim 1, wherein the at least one foam/gel member comprises multiple compressible members.

7. The assembly of claim 6, wherein the multiple compressible members comprise at least two for stacking in one trough.

8. The assembly of claim 6, further comprising a perimeter seal.

9. The assembly of claim 1, wherein the gel is polyurethane.

10. The assembly of claim 9, wherein the polyurethane gel is cured.

11. The assembly of claim 1, wherein the foam of the foam/gel member is at least partly open cell foam, is compressible, and at least partly saturated with gel.

12. The assembly of claim 1, wherein the underside of the antenna includes a recess about the antenna cable, and further including a gel seal about the cable and in the recess.

13. An electrically conductive assembly for providing a low resistance electrical contact between an antenna, the antenna having a flat underside, a footprint, and an antenna cable, and a corrugated train roof having multiple ridges with top surfaces and multiple troughs with floors, the assembly comprising:
 a gel and skeletal gasket member comprising a metallic member encapsulated in a tacky gel, the gel and skeletal gasket member dimensioned to have a perimeter about the same as the footprint of the antenna and having a flat top and a flat underside;
 multiple foam/gel members dimensioned to fit between the underside of the antenna and the underside of the gel and skeletal gasket member and the floor of the troughs and to extend above the top surface of adjacent ridges in an uncompressed state;
 the gel and skeletal gasket member for laying atop the foam/gel member and the top surfaces of the ridges and beneath the underside of the antenna such that compression between the antenna and the roof will cause some of the gel of the gel and skeletal member to squeeze out and will cause contact between the skeletal member and the roof, and the skeletal member and the underside of the antenna; and
 further comprising a perimeter seal;
  wherein the gel is polyurethane;
  wherein the gel is cured; and
  wherein the foam is compressible and at least partly saturated with gel.

14. The assembly of claim 13, further comprising a gasket tape wrap for wrapping the antenna cable.

15. The assembly of claim 13, wherein the electrically conductive skeletal member is woven metal.

16. The assembly of claim 13, further comprising make up gel.

17. The assembly of claim 13, wherein the foam is at least partly open cell foam.

18. An electrically conductive assembly for providing a low resistance electrical contact between an antenna, the antenna having a flat underside, a footprint, and an antenna cable, and a corrugated train roof having multiple ridges with top surfaces and multiple troughs with floors, the assembly comprising:
 a gel and skeletal gasket member comprising a metallic member encapsulated in a tacky gel, the gel and skeletal gasket member dimensioned to have a perimeter about the same as the footprint of the antenna and having a flat top and a flat underside;
 at least one foam/gel member dimensional to fit between the underside of the gel/skeletal gasket member and the floor of the troughs and to extend above the top surface of adjacent ridges in an uncompressed state;
 the skeletal gasket member for laying atop the foam/gel member and top surfaces of the ridges and beneath the underside of the antenna such that compression between the antenna and the roof will cause some of the gel to squeeze out and will cause contact between the electrically conductive skeletal member and the roof and the electrically conductive skeletal member and an underside of the antenna; and
 further comprising a perimeter seal;
  wherein the gel is polyurethane;
  wherein the gel is cured;
  wherein the foam of the foam/gel member is compressible and at least partly saturated with gel; and
 further comprising a gasket tape wrap for wrapping the antenna cable;

wherein the electrically conductive skeletal member is woven metal.

19. The assembly of claim 18, wherein the underside of the antenna includes a recess about the antenna cable, and further including a gel seal about the cable and in the recess.

* * * * *